United States Patent [19]
Kopasz

[11] 3,756,322
[45] Sept. 4, 1973

[54] UNDERGROUND VEGETABLE HARVESTER

[75] Inventor: Joseph Kopasz, Twining, Mich.

[73] Assignees: Joseph Kopasz, Jr., Flint; Genevieve Wilkie, Warren; Erwin Kopasz, Twining; Province of St. Joseph Capuchin Order, Inc., Detroit, Mich.; part interest to each

[22] Filed: Aug. 25, 1972

[21] Appl. No.: 283,976

[52] U.S. Cl. .................. 171/5, 171/26, 56/327 R
[51] Int. Cl. ........................................ A01d 17/00
[58] Field of Search ............ 171/5, 14, 24, 18, 171/26, 28, 40, 72, 75, 83, 124, 126, 136, 27, 62; 56/327 R

[56] References Cited
UNITED STATES PATENTS

| | | | |
|---|---|---|---|
| 669,908 | 3/1901 | Williams | 171/24 |
| 3,628,609 | 12/1971 | Graybill | 171/27 |
| 765,505 | 7/1905 | Moulton | 171/26 |
| 1,761,286 | 6/1930 | Zuckerman | 171/5 |

*Primary Examiner*—Antonio F. Guida
*Attorney*—John F. Learman, John J. Swartz et al.

[57] ABSTRACT

Apparatus for unearthing underground vegetables, such as potatoes and the like, comprising a supporting frame movable in a forward path of travel, a pair of transversely extending, rearwardly converging, vegetable digging and lifting blades on the frame movable through the soil for forcing the vegetables upwardly as the frame moves forwardly, a pair of transversely extending weed cutting knives reciprocally movable on the vegetable digging and lifting blades for severing weeds in the path of the digging and lifting blades and preventing the accumulation of dirt on the digging and lifting blades, and a pair of laterally spaced, power driven colter blades for cutting the earth forwardly and outwardly of the cutter knives and the digging and lifting blades.

10 Claims, 4 Drawing Figures

UNDERGROUND VEGETABLE HARVESTER

BACKGROUND OF THE INVENTION

This invention relates to a vegetable harvester which cleanly and rapidly harvests underground vegetables.

Underground vegetable harvesters have been provided in the past, but are not entirely satisfactory because the ground in which the vegetable grow tends to adhere to the crop lifting and digging blades and accumulates in front of the machine necessitating "shutdown" while the ground is removed. This accumulation of ground results in both the loss of time and crop. Accordingly, it is an object of the present invention to provide a harvester capable of increasing the yield of underground vegetable crop.

Another object of the present invention is to provide an underground vegetable harvester which eliminates the accumulation of large mounds of dirt in front of the harvester.

Vegetables growing in weedy fields are particularly difficult to harvest with the prior art vegetable harvesters because the weed roots frequently grow to a depth below the root of the vegetables and as the vegetable lifting blades pass under the vegetables, the weeds accumulate on the front of the knives causing the further accumulation of dirt forwardly of the lifting blades. A further object of the present invention is to provide an underground vegetable harvester of the type described including apparatus which will cut weeds in the path of the vegetable lifting blades to prevent the weeds from accumulating on the front of the vegetable lifting blades.

Another object of the present invention is to provide apparatus for harvesting vegetables which will sever the weeds and feed at least some of them rearwardly to a central discharge station while lifting or conveying vegetables in a rearward path of travel.

Vegetable harvesters have previously utilized traction colter discs or blades at the front and sides of the machine to break up the turf at each side of the machine to minimize the accumulation of mounds of soil laterally outwardly of the lifting blades as the underground vegetable harvester proceeds forwardly. Prior art machines commonly utilize rotatable traction colter blades or wheels which are merely forced into the ground as the machine is lowered and which are turned by ground friction as the machine moves forwardly. When the prior art vegetable harvesters are harvesting vegetables in hard ground, or ground laden with sticks, roots, and the like, the prior art colter discs will frequently not cut the ground to a sufficient depth. Accordingly, it is another object of the present invention to provide a vegetable harvester which includes power driven colter blades which will cut the soil to a sufficient depth.

Other objects and advantages of the present invention will become apparent to those of ordinary skill in the art as the description thereof proceeds.

SUMMARY OF THE INVENTION

Apparatus for unearthing underground vegetables, such as potatoes and the like, comprising frame support means adapted to be vertically moved between raised and lowered positions and adapted to be moved in a forward path of travel; transversely extending, rearwardly inclined, vegetable lifting blade means on the frame support means movable through the soil below the soil surface when the frame is in the lowered position for forcing the vegetables upwardly as the frame is moved forwardly, and transversely extending cutting means for cutting weeds and the like in the path of the blade means as the frame support means is moved in the forward path of travel.

The present invention may more readily be understood by reference to the accompanying drawings, in which.

DESCRIPTION OF THE PREFERRED EMBODIMENT

Figure 1:
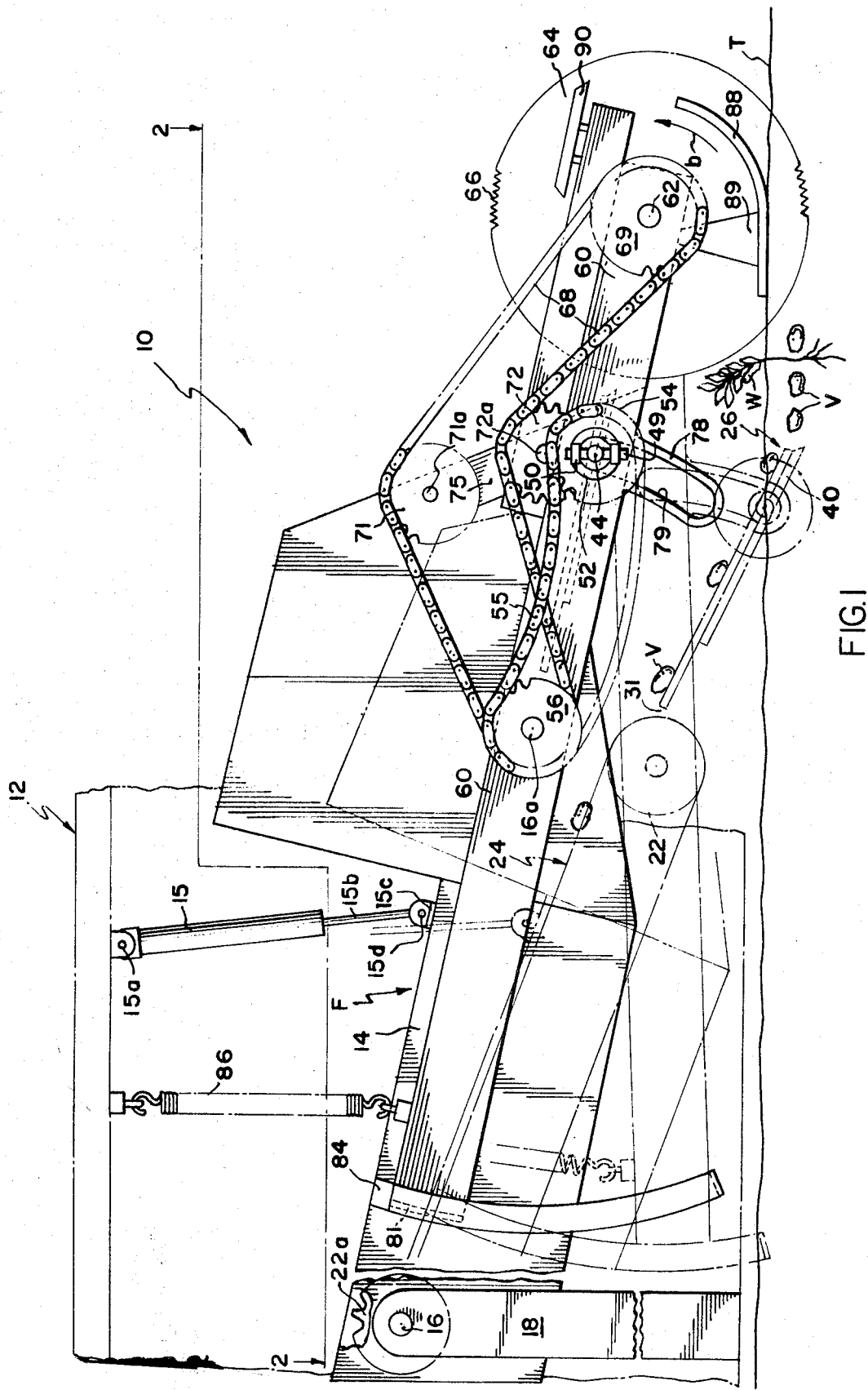
FIG. 1 is a side elevational view of vegetable harvesting apparatus constructed according to the present invention.

Vegetable unearthing apparatus constructed according to the present invention and generally designated 10 is mounted on the underside of the front portion of a vegetable combine, generally designated 12, which is supported on ground-engaging wheels (not shown) and self-propelled or drawn by a tractor or the like (not shown) across a field to be harvested.

The unearthing apparatus 10 includes a frame, generally designated F, including a pair of side frame members 14 spanned by cross bars 13 and pivotally mounted on a transverse shaft 16 journaled on upstanding frame members 18 supported by the combine 12.

Figure 2:
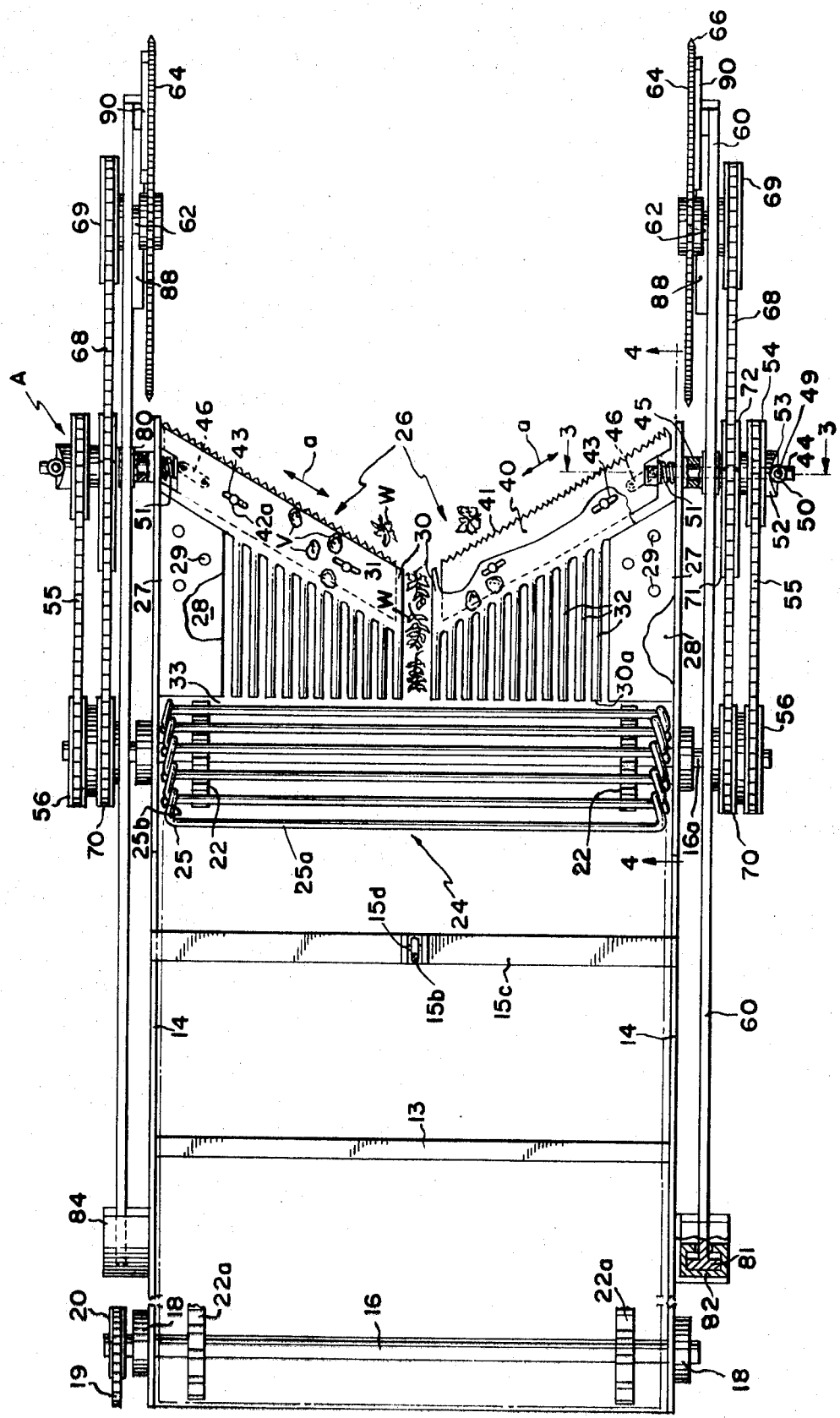
FIG. 2 is a top plan view of the vegetable harvesting apparatus taken along line 1—1 of FIG. 1, part of the apparatus being broken away to illustrate more clearly the underlying portions.

The frame F is swung about the shaft 16 between raised and lowered positions illustrated in solid and chain lines, respectively (FIG. 1), by a double acting, solenoid actuated, fluid operated ram 15 pivoted on a combine supported pivot pin 15a and including a piston rod 15b pivotally connected to a transverse bar 15c, spanning the side frame members 14, by a pivot pin 15d. A forward shaft 16a is journaled in the side frame members 14 and mounts a pair of idler sprocket wheels 22. A double hinge, elevating conveyor chain, generally designated 24, is trained around a pair of sprocket wheels 22a on the shaft 16 and the idler sprocket wheels 22 on the shaft 16a. The shaft 16 is driven by an endless chain 19 trained around a sprocket 20 on the shaft 16 and the output sprocket on the output shaft of a combine supported drive motor (not shown). The conveyor 24 includes a plurality of individual chain links 25, each including a transversely extending bar 25a (FIG. 2) and hook portions 25b at opposite ends which hingedly receive the hook portions 25b of an adjacent link 25. The sprocket wheels 22 and 22a drivingly engage the transversely extending bar portions 25a of the links 25 as illustrated in FIG. 2.

Mounted on the side frame members 14 forwardly of the conveyor chain 24, is a pair of generally flat, rearwardly inclined digging or lifting blades, generally designated 26. The blades 26 include longitudinally extending side plate portions 27 mounted on side wall supported plates 28 by bolts 29, and rearwardly converging lifting blade sections 30 spaced from each other by a central gap 31. A grate for screening any earth remaining on the vegetables is provided and comprises a plurality of generally parallel, longitudinal, vegetable supporting and lifting fingers 32 welded to the rear edge portions of the lifting blade sections 30. The vegetable supporting and lifting fingers 32 are generally cylindrical in end cross section and include rearward terminal ends 30a spaced from the front of the conveyor chain 24 by a gap 33 having a width equal to the spacing between the fingers 32. When the frame F is swung about the conveyor drive shaft 16 to its lowered position, the blades 26 move therewith to the lowered operative position, illustrated in chain lines in FIG. 1, below the turf T to force the underground vegetables V upwardly as the frame F moves forwardly with the combine 12. The rearwardly inclined digging and lifting blades 26 force the vegetables V upwardly onto the grid-like fingers 32 as the blades 26 move forwardly through the soil. The fingers are spaced approximately one inch apart to permit any remaining loose ground to fall therethrough, but pass the vegetables V onto the conveyor chain 24 which conveys the vegetables V rearwardly to another conveyor chain (not shown) on the combine 12 for further processing.

Figure 3:
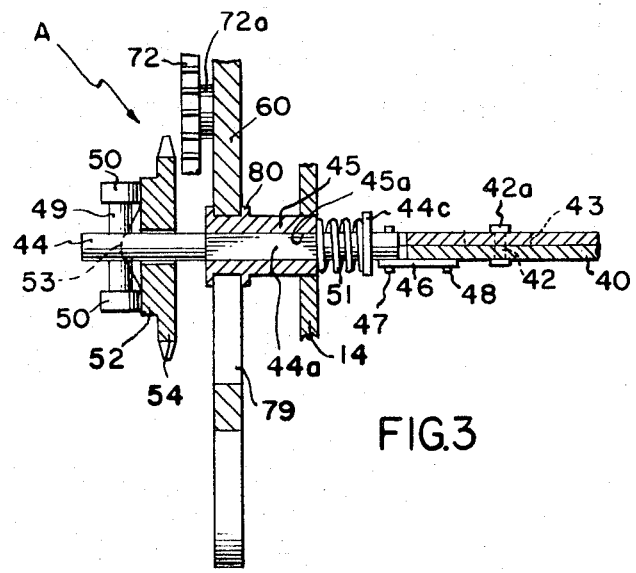
FIG. 3 is an enlarged, sectional end view of the cutting blade drive apparatus taken along the line 3—3 of FIG. 2.
Figure 4:
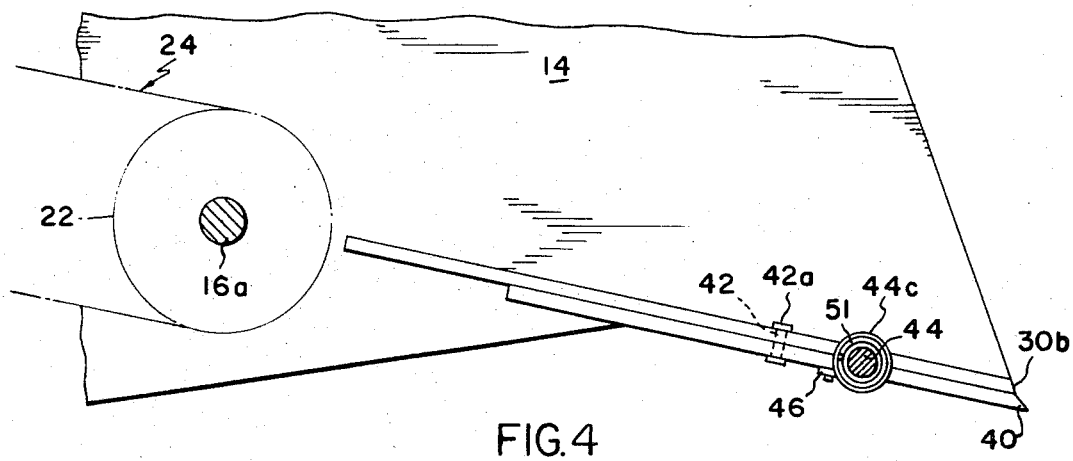
FIG. 4 is a sectional side view taken along the line 4—4 of FIG. 2.

To prevent dirt from accumulating on the vegetable digging and lifting blades 26 and to prevent weeds W in the path of the blades 26 from accumulating on the leading edge 30b of the blades 26, each of the blades 26 reciprocally mounts a generally flat weed cutting knife 40 having a serrated leading knife edge 41 which cuts the weeds W in the path of the lifting blades 26. The weed cutting knives 40 are mounted on the undersides of the lifting blades 26 by a plurality of guide pins 42, having enlarged knife supporting heads 42a (FIG. 3), fixed to the cutting knives 40 and extending through enlarged, elongated slots 43 in the lifting blades 26 for guiding the knives 40 for movement in to-and-fro paths of travel, designated by the arrows a (FIG. 2).

Apparatus is provided on each side frame member 14 for reciprocating the knives 40 in the to-and-fro paths, designated by the arrow a, and each comprises a cam-operated shaft 44 (FIG. 3) slidably received in a bushing 45 mounted in the side wall 14, and pivotally connected to the knife 40 by a pivotal link 46 connected to the reciprocable shaft 45 by a pivot pin 47 and to the weed cutting knife 40 by a pivot pin 48. The midportion 44a of the shaft 44 is square in end cross-section and is received in a complementally shaped bore 45a in the bushing 45 to prevent the shaft 44 from rotating as it reciprocates.

Apparatus, generally designated A, is provided at each side of the frame F for reciprocating the shaft 45 and weed cutting knives 40 and since the apparatus at each side is identical, only the apparatus A on the left side of the frame will be described, it being understood that identical parts of the apparatus A on the right side of the frame are identified with identical reference characters. The apparatus A includes a pin 49 fixed to the reciprocable shaft 44 and mounting a pair of follower rollers 50 which engage a cam wheel 52 having circumferentially spaced, axially protruding cam lobes 53, fixed to a sprocket wheel 54 rotatably journaled on the shaft 44. An endless drive chain 55 is trained around the sprocket wheel 54 and another sprocket wheel 56, fixed to the front elevator conveyor shaft 16a, to drive the sprocket wheel 54 and cam 52 so that the axially protruding lobes 53 successively force the follower rollers 50 and the shaft 44 axially outwardly against the restraining force of a spring 51, reacting between the bushing 45 and a flange 44c on the shaft 44 which returns the shaft 44 axially inwardly as the cam follower rollers 50 clear or circumferentially move beyond the lobes 53. The knife 40 moves with the reciprocating shaft 44 in a to-and-fro path designated by the arrow a.

After the weeds W are severed, at least some of them are cammed centrally by the digging blades to the gap 31 between the lifting blade sections 30 through which the weeds W pass as the apparatus moves forwardly.

Reciprocation of the knives 40 causes the lifting blades 26 to vibrate and shake loose dirt which would otherwise adhere to the lifting blades to keep the blades 26 clean and thus minimize the accumulation of dirt in front of the machine.

THE COLTER BLADE ASSEMBLY

Apparatus is provided for vertically cutting the turf T in advance of the vegetable lifting blades 26 and the cutting knives 40 and comprises a pair of longitudinally extending colter mounting bars 60 rotatably mounted on the end of the front elevator conveyor shaft 16a. Mounted on a shaft 62, journaled in the forward end of each colter mounting bar 60, is a colter blade or disc 64 having a serrated or toothed peripheral edge 66 for cutting the turf T when the disc is rotated. The colter discs 64 are driven in a counterclockwise direction, represented by the arrow b (FIG. 1), by chains 68 trained around sprocket wheels 69 fixed to the colter mounting shafts 62, sprocket wheels 70 fixed to the forward elevator conveyor shaft 16a, and pairs of idler sprocket wheels 71 and 72 journaled on shafts 71a and 72a mounted on an upstanding arm 75 fixed to the support bars 60. The linear path of travel of the upper peripheral edge of each colter disc 64 is opposite the forward direction of travel while the linear path of travel of the lower peripheral edge of each colter disc 64 is forward so that the blades 64 will "dig" themselves in the soil. To allow the pivotal, colter support bars 60 to swing relatively to the frame 14, a slot 79 is cut therein and receives the bushing 45. Guide portions 78 depend from the underside of the bars 60 to provide guides which cooperate with flanges 80 on opposite ends of the bushing 45 to prevent lateral movement of each colter support bar 60 as it swings between its operative and inoperative positions illustrated in chain and solid lines, respectively (FIG. 1).

The rearward ends of the colter support bars 60 include T-shaped guides 81 received in complementally shaped, vertically curvilinear tracks 82 fixed to the side frame members 14. The tracks 82 permit the colter support bars to swing in an arcuate path, but prevents rearward movement of the bars 60 relative to the side frame members 14 in the event that the colters 64 strike an obstruction during forward movement. Stops 84 (FIG. 1) are provided at the upper ends of the tracks 82 to limit the upward swinging movement of the colter support bars 60. A pair of springs 86 bias the the colter support arms 60 to the raised position illustrated in solid lines in FIG. 1.

The colter blades 64 will cut the soil at least to the depth of the digging and lifting blades 26 in the lowered operative position. For limiting the downward travel of the colter blades 64 into the soil, turf engaging shoes 88 are fixed to the front ends of the pivotal frame bars 60 by brackets 89. Scraper blades 90 are also mounted on the colter mounting bars 60 for scraping dirt off the sides of the colter blades 64.

THE OPERATION

The combine 12 is propelled across a field so that at least one row of vegetables is in line with each digging and lifting blade 26. The fluid operated cylinder 15 is operated to lower the frame member F until the digger blades 26 are in the lowered, operative position illustrated in chain lines in FIG. 1, so that the leading edge 30b of the blades 26 is in the soil below the vegetables V. As the frame member F is lowered, the colter discs 64, which are rotated in the direction of the arrow b, dig into the ground until they reach the positions illustrated in FIG. 1. The colter support bars 60 are permitted to swing from the position illustrated in solid lines in FIG. 1 to the position illustrated in chain lines in FIG. 1, by the slots 79 in the colter support bars 60, which receive the shaft mounting bushings 45. As the combine 12 is moved forwardly, the vegetables V are forced upwardly by the lifting and digging blades 26 onto the fingers 32 which permits the dirt remaining with the vegetables to fall therethrough while guiding the vegetables rearwardly onto the chain conveyor 24 that moves them rearwardly for further processing. The weeds W in the path of the digging and lifting blades 26 are severed by the reciprocating knives 40 and are then passed rearwardly through a central gap 31.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Apparatus for unearthing underground vegetables, such as potatoes and the like, embedded in soil comprising:
    forwardly movable frame support means;
    a pair of rearwardly inclined, rearwardly converging, vegetable digging blades, mounted on said frame for vertical movement between a raised position, removed from the soil, and a lowered position below the soil surface, forwardly movable with said frame means through the soil below the soil surface when said blades are in said lowered position, for forcing the underground vegetables upwardly;
    a pair of rearwardly converging cutting knives, having leading cutting edges, mounted on said digging blades such that said leading cutting edges pass beneath said vegetables when said blades are in said lowered position, said cutting knives being movable relative to said digging blades such that said leading cutting edges pass beneath said vegetables when said blades are in said lowered position, said cutting knives being movable relative to said digging blades in independent cutting paths of travel, for cutting weeds, and the like in the paths of the digging blades as said frame means moves forwardly; and
    drive means on each side of said frame means for independently moving said cutting knives independently of each other on said digging blades in said independent cutting paths of travel as said frame means moves forwardly to sever said weeds.

2. The apparatus set forth in claim 1 including a pair of laterally spaced apart, longitudinal support bars swingably mounted on said frame means, a generally vertical colter blade rotatably mounted on each bar laterally outwardly and forwardly of said cutting means and said digging means.

3. The apparatus of claim 2 including stop means at the rearward end of each of said side bars preventing rearward movement thereof in the event said colter blades strike an obstruction but permitting vertical swinging movement thereof to permit said colter blades to be moved into and out of the ground.

4. The apparatus set forth in claim 2 including motor means drivingly connected to said colter blades for positively driving said colter blades.

5. The apparatus set forth in claim 4 wherein said motor means drives said colter blades such that the lower peripheral portion of said blades are driven in a forward direction relative to the forward path of travel of said frame means.

6. The apparatus of claim 5 including a pair of laterally spaced apart, longitudinally extending, support bars swingably mounted on said frame means and rotatably supporting said colter blades at the forward ends thereof; and stop means preventing longitudinal rearward movement of the support bars but permitting vertical swinging movement thereof.

7. The apparatus as set forth in claim 1 wherein said rearwardly inclined vegetable digging blades are separated by a central gap; said cutting knives being mounted on the leading edges of said blades for movement in said to-and-fro paths of travel, and being separated from each other by a gap aligned with said central gap.

8. The apparatus as set forth in claim 1 wherein said drive means comprises means for converting rotary motion into linear motion.

9. The apparatus as set forth in claim 8 wherein said drive means comprises rotary cam means and cam follower means responsive to said cam means for moving said follower means in said to-and-fro paths of travel.

10. The apparatus as set forth in claim 8 wherein said digging blades each includes a grate comprising a plurality of rearwardly extending, laterally spaced apart, vegetable supporting fingers for supporting said vegetables, but permitting soil to pass therethrough.

* * * * *